(12) United States Patent
Newstadt et al.

(10) Patent No.: US 8,127,033 B1
(45) Date of Patent: Feb. 28, 2012

(54) METHOD AND APPARATUS FOR ACCESSING LOCAL COMPUTER SYSTEM RESOURCES FROM A BROWSER

(75) Inventors: Keith Newstadt, Newton, MA (US); Shaun Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 261 days.

(21) Appl. No.: 12/240,540

(22) Filed: Sep. 29, 2008

(51) Int. Cl.
*G06F 15/16* (2006.01)
(52) U.S. Cl. ......... 709/229; 709/223; 709/224; 709/203
(58) Field of Classification Search .................. 709/229, 709/223–224, 203, 219
See application file for complete search history.

(56) References Cited

U.S. PATENT DOCUMENTS

| | | | |
|---|---|---|---|
| 6,591,299 B2 * | 7/2003 | Riddle et al. | 709/224 |
| 7,080,408 B1 * | 7/2006 | Pak et al. | 726/24 |
| 7,099,915 B1 * | 8/2006 | Tenereillo et al. | 709/203 |
| 7,472,418 B1 * | 12/2008 | McCorkendale et al. | 726/24 |
| 2002/0078371 A1 * | 6/2002 | Heilig et al. | 713/200 |
| 2003/0101353 A1 * | 5/2003 | Tarquini et al. | 713/200 |
| 2004/0059797 A1 * | 3/2004 | Velan et al. | 709/219 |
| 2006/0085505 A1 * | 4/2006 | Gillum et al. | 709/206 |
| 2007/0058621 A1 * | 3/2007 | Okmianski et al. | 370/389 |

* cited by examiner

*Primary Examiner* — Philip B Tran
(74) *Attorney, Agent, or Firm* — Wilmer Cutler Pickering Hale and Dorr LLP

(57) ABSTRACT

A method and apparatus for accessing local system resources from a browser is described. The method for providing access to local computer system resources through a browser includes processing network traffic associated with a browser to identify at least one command parameters and communicating the at least one command parameter for execution using local computer system resources.

17 Claims, 4 Drawing Sheets

METHOD AND APPARATUS FOR ACCESSING LOCAL COMPUTER SYSTEM RESOURCES FROM A BROWSER

BACKGROUND OF THE INVENTION

1. Field of the Invention

Embodiments of the present invention generally relate to techniques for accessing local computer system resources. More specifically, embodiments of the present invention relate to a method and apparatus to access local computer system resources from an isolated application (e.g., a browser) which has limited or no access to the local computer system resources under normal circumstances.

2. Description of the Related Art

Computer systems are often subject to unauthorized access attempts by malicious software and users. Such malicious entities gain access to sensitive system resources and data. These resources may include sensitive system files, input/output devices, system configuration data, user information, file operations, or any other resource to which a malicious entity should not have access. In order to protect these resources, it is common practice to prevent certain application types from accessing such protected resources.

One of the most common avenues of attack is through a web browser. By exposing the local computer to the internet, a user takes a risk that any web server they communicate with may attempt to gain access to private system resources. Because of the inherent vulnerability of software that interfaces with remote computers, it is common practice to screen browser applications from interacting directly with these resources. Various frameworks such as browser add-on modules ("plug-in"s), and application programming interfaces ("API"s), are provided in the event the browser needs to access such resources without compromising system security. Generally, the application developer must know the specific framework required for each type of browser and resource.

While browser plug-ins to support a web based application provide one possible technique for accessing the protected resources, they are not an optimal solution because they must be individually tailored to each browser. Operating systems also may provide API frameworks for accessing these resources, but, as with plug-ins, the application must be tailored to a specific operating system. Additionally, a developer must ensure the plug-in and API implementation are updated so that the release of a new version of the browser or operating system does not disrupt access to the web application.

As web applications (e.g., designed to be run within a browser) become more and more popular, the software developer must spend an increasing amount of time ensuring application compatibility. This results in substantial additional development and maintenance time if the developer wishes to reach the largest possible user base.

Therefore, there exists a need in the art for a method and apparatus that enables a user to access protected system resources that is not dependent upon a particular browser configuration or API framework installation.

SUMMARY OF THE INVENTION

Embodiments of the present invention comprise a method and apparatus for accessing local system resources from a browser. In one embodiment, the method for providing access to local computer system resources through a browser includes processing network traffic associated with a browser to identify at least one command parameters and communicating the at least one command parameter for execution using local computer system resources.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
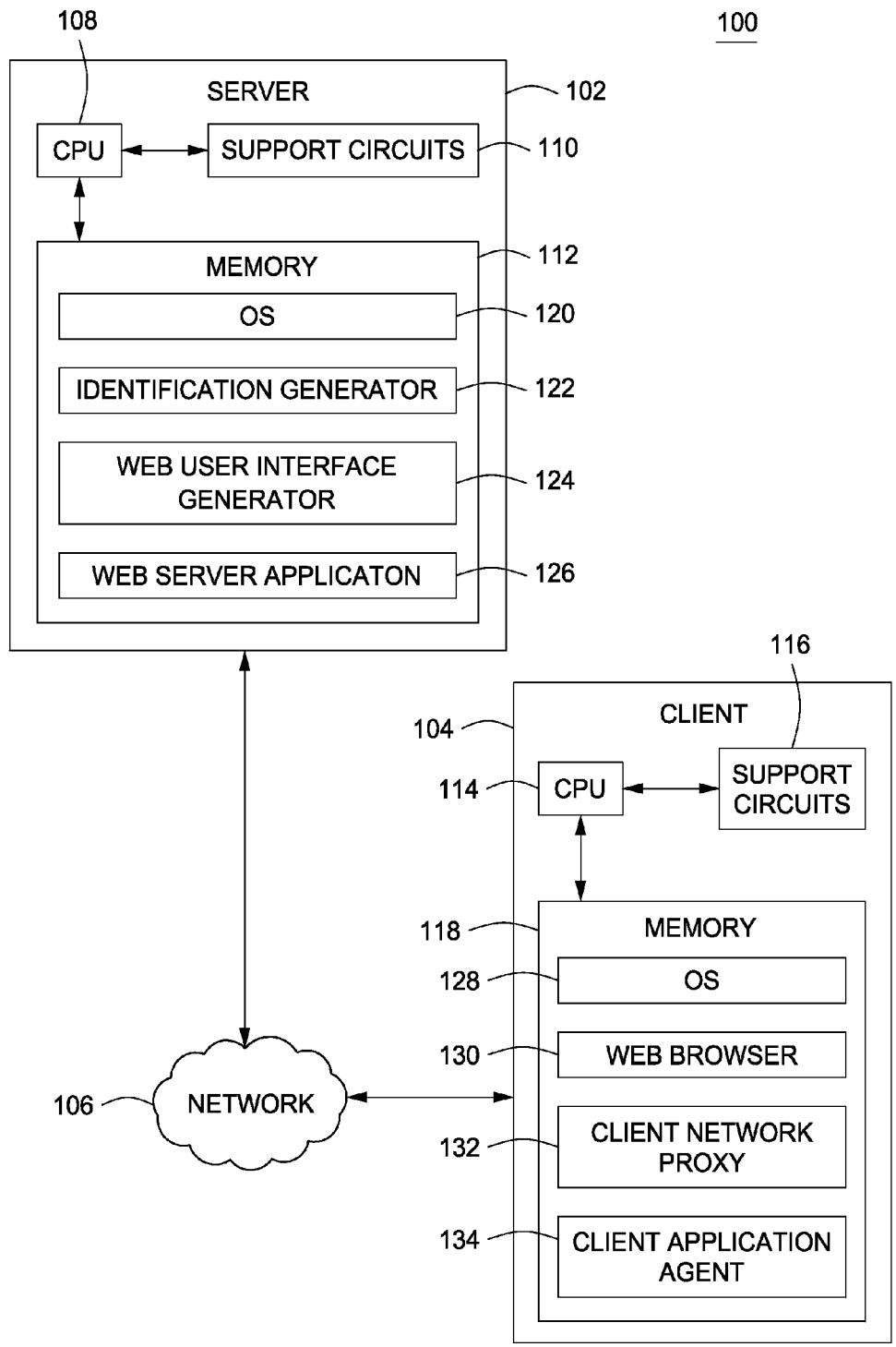
FIG. 1 depicts a block diagram of a computer network utilizing an embodiment of the present invention to access protected system resources using a web browser in accordance with an embodiment of the invention.

FIG. 1 is a block diagram of a system 100 for accessing local computer system resources through an isolated application according to an embodiment of the present invention. In one embodiment, the system 100 includes a server 102 and a client computer 104 where each is coupled to each other through a network 106.

In one embodiment, computer system resources may be protected and thus, subject to access control, such as disk access, file operations (i.e. copying, creation, modification, and deletion of files), input/output device access, application execution, system configuration file access, and the like. In one embodiment, hypertext transfer protocol (HTTP) traffic includes various commands for accessing the local computer system resources, which may be selected via uniform resource locator (URL) links on a web page presented by a browser. It is appreciated that the present invention is not limited to embodiments that utilize HTTP and URL links. Hence, the various commands may be embedded into and sent via any network data as explained further below.

The server 102 is a computing device such as those generally known in the art. The server 102 includes a central processing unit (CPU) 108, support circuits 110, and memory 112. The CPU 108 may comprise one or more commercially available microprocessors or microcontrollers that facilitate data processing and storage. The various support circuits 110 are utilized to facilitate the operation of the CPU 108 and include such circuits as clock circuits, power supplies, cache, input/output circuits, and the like. The memory 112 may comprise random access memory, read only memory, removable storage, optical disk storage, disk drive storage, and combinations thereof. The memory 112 stores a server operating system 120, an identification generator 122, a web user interface generator 124, and a web server application 126. In operation, the CPU 108 executes the operating system 120 to control the general utilization and functionality of the server 102.

The CPU 108 also executes the web server application 126 in response to web page requests (e.g., HTTP requests) received by the server 102. The web server application 126 may include software code designed to respond to network requests, such as APACHE Web Server, GOOGLE Web Server and/or the like. When a page request is received, the web server application 126 executes the web user interface generator 124. When the web page request corresponds to a page that includes embedded commands for accessing the local computer system resources, the web user interface generator 124 creates one or more URL links encoded with the embedded commands. Then, the web server application 126 communicates the embedded commands via the one or more URL links. The web user interface generator 124 uses the identification generator 122 to create a unique identifier (e.g., Globally Unique Identifier (GUID)) for each command that the client network proxy 132 may use to authenticate the each command before execution by the client application agent 134. The web server application 126 embeds such an identifier into the one or more URL links along with the each command. The web server application 126 incorporates these links into the created web page and responds to the web page request.

The network 106 comprises a communication system that connects a computer system by wire, cable, fiber optic, and/or wireless link facilitated by various types of well-known network elements such as hubs, switches, routers, and the like. The network 106 may employ various well-known protocols to communicate information amongst the network resources. For example, the network 106 may be part of the internet or an intranet and may use various communications infrastructures such as Ethernet, WiFi, WiMax, General Packet Radio Service (GPRS) and the like.

The client computer 104 is a computing device such as those generally known in the art. As with the web server, the client computer 104 comprises a CPU 114, support circuits 116, and memory 118. The CPU 114 may comprise one or more commercially available microprocessors or microcontrollers that facilitate data processing and storage. The various support circuits 116 facilitate the operation of the CPU 114 and include clock circuits, power supplies, cache, input/output circuits, and the like. The memory 118 may comprise read only memory, random access memory, disk drive storage, optical storage, removable storage, and the like. The memory 118 stores software that includes a client operating system 128, a web browser 130, a client network proxy 132 and a client application agent 134. In operation, the CPU 114 executes the operating system 128 to control the general utilization and functionality of the client computer 104.

In operation, the CPU 114 executes the web browser 130 to communicate one or more web page requests to the web server 102. The web browser 130 is an isolated application that operates within a restricted environment where access to local computer system resources is achieved via commands embedded within one or more URL links on one or more web pages. In operation, when a URL link is selected and an embedded command is communicated by the web browser 130 to the web server 102, the client network proxy 132 intercepts and parses the embedded command in order to extract one or more parameters that form the embedded command. The one or more command parameters define one or more operations to be performed using the local computer system resources. For example, the one or more command parameters may include a parameter that defines the embedded command (e.g., "backupnow", "deleteallfiles" and/or the like) and a parameter that defines target data (e.g., music files). While the present embodiment comprises a client network proxy 132 implemented in software, it would be obvious to one skilled in the art that the client network proxy 132 may also be implemented via an application specific integrated circuit (ASIC) or field programmable gate array (FPGA).

According to one or more embodiments of the present invention, all inbound and/or outbound network traffic (e.g., HTTP traffic) passes through the client network proxy 132. If the inbound and/or the outbound network traffic includes one or more embedded commands, then the client network proxy 132 parses the one or more embedded commands. The client network proxy 132 identifies one or more command parameters that define one or more operations to be performed using the local computer system resources. The client network proxy 132 redirects the one or more command parameters associated with the one or more embedded commands to the client application agent 134.

In one embodiment, the client network proxy 132 compares the incoming network traffic to various filtering criteria. For example, the filtering criteria may include, but is not limited to, particular protocols, domain names, unique identifiers (e.g., GUIDs), port numbers, data patterns and/or the like. When the client network proxy 132 determines that there is a match between a portion of the incoming network traffic and the filtering criteria, the portion of the incoming network traffic is examined for the one or more embedded commands as well as the one or more command parameters. In one embodiment, the one or more command parameters for the one or more embedded commands are stored as character strings in a URL link within a HTML document. In operation, the client network proxy 132 intercepts and parses the HTML document to locate the one or more command parameters for the one or more embedded commands. Then, the client network proxy 132 stores a unique identifier and a domain name associated with that URL. This client network proxy 132 may use the unique identifier to authenticate an embedded command within the incoming network traffic before execution.

In one embodiment, the client network proxy 132 compares the outgoing network traffic to various filtering criteria. If outgoing network traffic meets the filtering criteria, then any commands encoded within the transmitted data are parsed and sent to the client application agent 134 to be executed. If a command is sent to the client application agent 134 by the client network proxy 132, it may modify the network traffic communication originally sent. Unlike the web browser 130, the client application agent 134 does not exist in a "Sandbox" environment, and can directly access system resources that the web browser 130 is unable to access. If the original communication is not a valid command or is a valid command that has been modified by the client network proxy 132, the communication is then sent out via the network 106.

Figure 2:
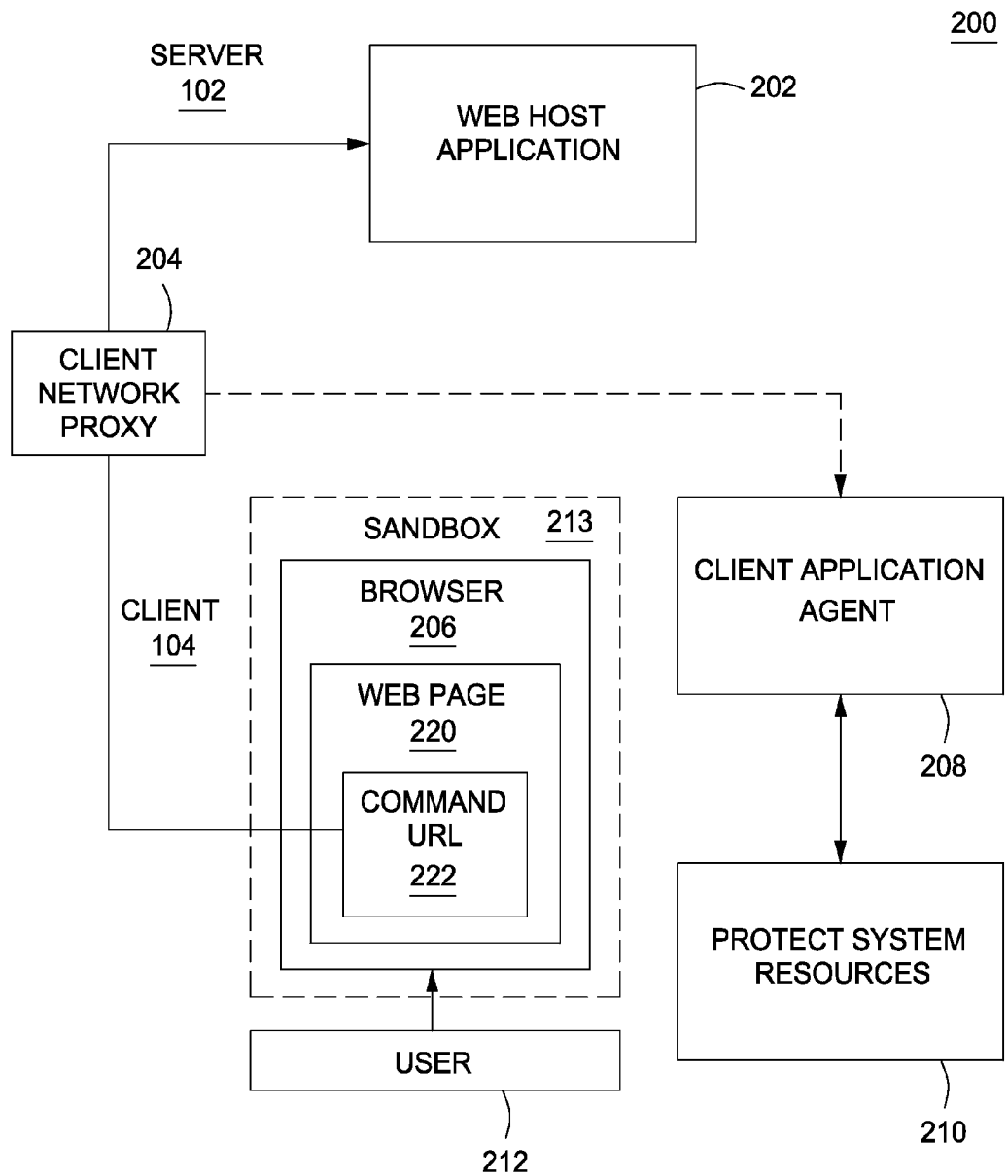
FIG. 2 depicts a functional block diagram of the interaction between the client computer and the remote computer in accordance with an embodiment of the present invention.

FIG. 2 depicts a functional diagram of the system 200 for an embodiment of a method by which protected system resources may be accessed by filtering network traffic. A server executes a web host application 202. A browser 206 depicts a web page 220 received from the web host application 202 which contains a URL 222 that contains embedded command parameters. The browser 206 exists in a sandbox 213 environment which prevents it from accessing protected system resources 210. When the user 212 selects the URL 222, a network request is sent to the web host application 202. The client network proxy 132 filters the outgoing request for embedded command parameters. The embedded command parameters are parsed by the client network proxy 132 and transferred to a client application agent 134. The client application agent 134 then executes commands corresponding to the embedded command parameters received from the client network proxy 132. During execution, the client application agent 134 may access protected system resources 210 as needed, because it exists outside of the browser sandbox 213.

Figure 3:
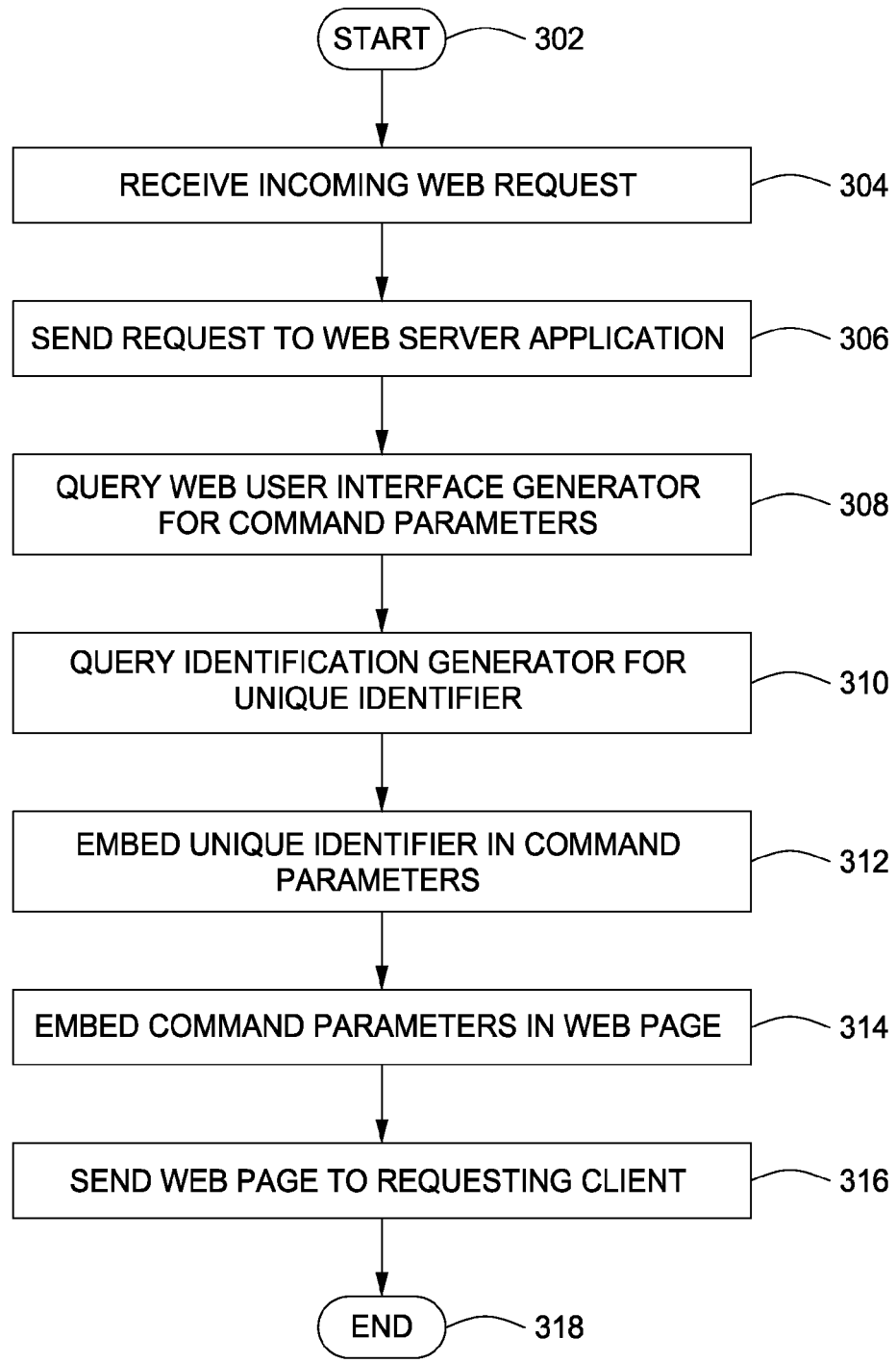
FIG. 3 depicts a flow diagram of a method for embedding program commands in a web page in accordance with an embodiment of the present invention.

FIG. 3 depicts a flow diagram of a method 300 of processing a web page request on the server 104 by embedding an application command into a URL link and generating a web page with the embedded link in accordance with one embodiment of the invention. The method 300 begins by receiving a web page request at step 304. The request is forwarded to the web server application 126 at step 306. Once the server application has received the request, it begins the process of generating the web page at step 308 by querying the web user interface generator 124 for the command links. When the web user interface generator 124 receives the request, it uses the identification generator 122 to create a unique identifier for the command at step 310. The unique identifier and application command are embedded in the newly created URL at step 312. For example, a URL created to execute a backup command may read: http://www.norton.com/online_backup/action?command=backupnow&set=files&id={ABCDEF12-3456-GH78}. The completed URL is passed back to the web server application 126 where it is embedded in the newly generated web page by the web server application 126 at step 314.

Figure 4:
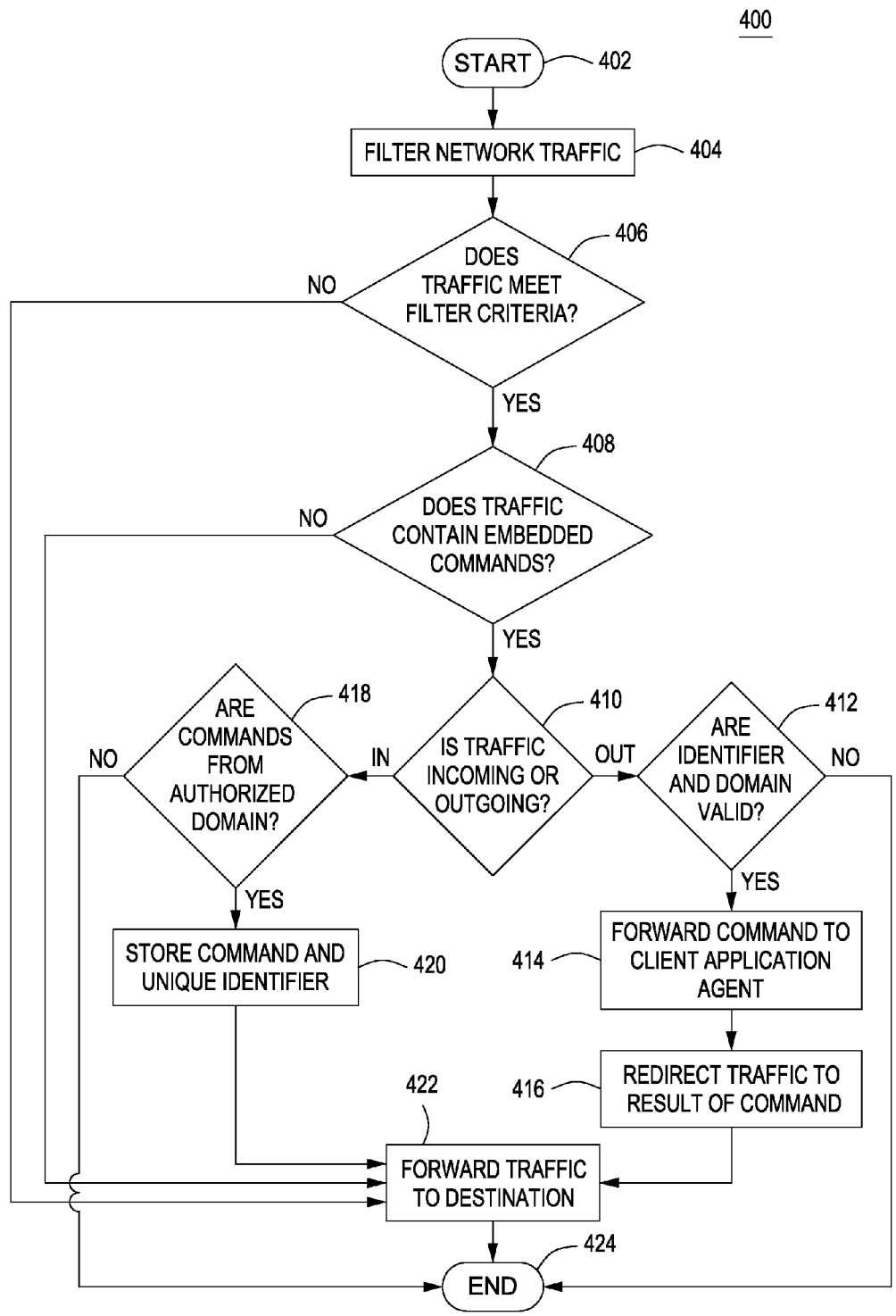
FIG. 4 depicts a flow diagram of a method of filtering network traffic to parse and execute web page-embedded commands in accordance with an embodiment of the present invention.

FIG. 4 depicts a flow diagram of a method 400 by which a client network proxy 132 transfers commands received through HTTP traffic to a client application agent in accordance with an embodiment of the invention. The web browser 130 has requested a web page with command embedded URLs from the web server 102, and one or more of these URLs has been activated. When the URL is activated, the web browser 130 sends a network request to access the web page specified in the URL. In the embodiment shown in FIG. 3, the client network proxy 132 is configured to filter HTTP traffic being transmitted on port 80. This filtering is performed at step 404.

As shown at step 406, if the traffic meets the specified command parameters, such as being a HTTP request made on port 80, the client network proxy 132 makes a determination of whether the traffic is incoming from the network or outgoing to the network. At step 408, the traffic is parsed to determine if it contains embedded command parameters. If embedded command parameters are present, the traffic is sent to the client application agent 134. If the traffic does not meet specified command parameters, it is forwarded to the network for processing at step 422.

At step 408, a decision is made to determine if the traffic contains valid command parameters. Valid command parameters are specified by character strings in the URL corresponding to specific actions that the client application agent 132 is capable of performing. Examples of possible actions are backing up files, accessing user data, deleting files, parsing logs, and the like. If the URL does not contain a valid command parameter, it is forwarded to the network for normal processing at step 422.

At step 410, the client network proxy 132 determines whether the network traffic is incoming from the network 106 or outgoing to the network 106. If the traffic is incoming, the method proceeds to step 418 to store the command. If the traffic is outgoing, the method proceeds to step 412 to execute the command.

If the traffic is outgoing the link is parsed to determine if it contains a valid domain name at step 412. If the domain name present in the link matches a pre-defined list of domains authorized to execute that command, then the unique identifier is tested to verify the source of the command. This testing is performed to verify that the URL was received from an authorized site, in order to prevent malicious websites from tricking the user into executing unwanted commands. For example, if the site www.hacker.com was not authorized to send a "delete all files" command, the command URL http://www.hacker.com/online_backup/action?command=deleteallfiles would fail. If the command URL was determined to be from an invalid URL, the request would be terminated at step 424.

At step 412, if the link was to a valid URL, the client network proxy 132 determines whether the page the link is executed from is from the same location that originally sent the link. Every time the web browser 130 retrieves a web page, the client network proxy 132 parses it. When the client network proxy 132 filters a command URL embedded in a web page from an authorized domain name, the client network proxy 132 tracks the unique identifier associated with that command. When an embedded command parameter containing that command is sent, the client network proxy 132 verifies at step 412 that the GUID associated with the command is identical with the GUID originally received with the command. This verification prevents the user from receiving a valid command from an authorized website, but then executing a link hosted on a malicious website. The malicious link might point to the correct domain name, and the command might be authorized because it was properly loaded from an authorized page, but without the authentication GUID, the command is not executed.

At step 414, the URL contains a valid GUID, then the command encoded in the link is executed. Because the client application agent 134 is authorized to access protected system resources, the client application agent 134 can perform operations that are not normally possible to execute from a browser environment. During this step, the client network proxy 132 sends the command parameters to the client application agent 134. After the command is executed, the client application agent 134 informs the client network proxy 132 of the result. The client network proxy 132 then modifies the outgoing URL request to point to a web page indicating the outcome of the executed command at step 416.

Finally, at step 422 the URL request is forwarded to the network 106 to process the outgoing web page request. If the traffic is outgoing and contains embedded commands, the client network proxy 132 determines whether or not the commands are received from a valid domain at step 418. If the traffic does not contain embedded commands, it is forwarded to its destination at step 422. If the domain name from which the command was received is a valid domain, the command is stored for later execution at step 420. If the domain name is invalid, the command is not stored.

At step 420, the command and unique identifier present in the network traffic are stored in memory so that they can be executed. Only commands stored in this manner are eligible for execution in order to prevent unauthorized web pages from accessing protected system resources. At step 422, the network traffic has been parsed and the client network proxy 132 passes it to the network 106.

While the foregoing is directed to embodiments of the present invention, other and further embodiments of the invention may be devised without departing from the basic scope thereof, and the scope thereof is determined by the claims that follow.

The invention claimed is:

1. A method for providing access to local computer system resources of a client device through a browser comprising:
processing network traffic associated with a browser using a client network proxy coupled to the client device to identify at least one command parameter, wherein the at least one command parameter defines an operation requiring one or more local computer system resources of the client device that the browser does not have a sufficient access level to utilize wherein the at least one command parameter forms at least one embedded command;
communicating the at least one command parameter for execution by the client network proxy using the one or more local computer system resources of the client device where the client network proxy has a sufficient access level to access the one or more local computer system resources of the client device; and
authenticating the at least one embedded command by comparing a unique identifier associated with an embedded command of the at least one embedded command within inbound network traffic with a unique identifier associated with an embedded command of the at least one embedded command within outbound network traffic.

2. The method of claim 1, wherein the at least one command parameter forms at least one command embedded within at least one Uniform Resource Locator.

3. The method of claim 1, wherein authenticating the at least one embedded command further comprises verifying at least one domain name of the at least one Uniform Resource Locator for issuing the at least one embedded command.

4. The method of claim 1, wherein authenticating the at least one embedded command further comprises comparing a domain name associated with an embedded command of the at least one embedded command within inbound network traffic to a domain name associated with the embedded command of the at least one embedded command within outbound network traffic.

5. The method of claim 1, wherein the at least one embedded command comprises at least one of a disk access, a file operation, an input device access, an output device access, an application execution or a system configuration file access.

6. The method of claim 1, wherein processing the network traffic further comprising:
processing outbound network traffic to identify at least one command embedded in at least one Uniform Resource Locator; and
parsing the at least one Uniform Resource Locator to extract the at least one command parameter.

7. The method of claim 6, wherein communicating the at least one command parameter further comprises redirecting the at least one command parameter to an application for executing the at least one command parameter.

8. The method of claim 1, wherein processing the network traffic further comprising:
processing inbound network traffic to identify at least one command embedded in at least one Uniform Resource Locator; and
parsing the at least one Uniform Resource Locator to extract at least one unique identifier and at least one domain name.

9. The method of claim 1, wherein the local computer system resources of the client device are configured to operate on the client device.

10. An apparatus for providing access to local computer system resources of a client device through a browser comprising:
a client network proxy for processing network traffic associated with a browser to identify at least one command parameter, wherein the client network proxy is coupled to the client device and the at least one command parameter defines at least one embedded command within at least one Uniform Resource Locator, wherein the at least one embedded command is an operation requiring one or more local computer system resources of the client device that the browser does not have a sufficient access level to utilize, and wherein the client network proxy authenticates the at least one embedded command by comparing a unique identifier associated with an embedded command of the at least one embedded command within inbound network traffic with a unique identifier associated with an embedded command of the at least one embedded command within outbound network traffic; and
communicating the at least one command parameter for execution by the client network proxy using the one or more local computer system resources of the client device where the client network proxy has a sufficient access level to access the one or more local computer system resources of the client device.

11. The apparatus of claim 10 further comprising an application agent for executing the at least one command parameter.

12. The apparatus of claim 10, wherein the proxy verifies at least one domain name of the at least one Uniform Resource Locator for issuing the at least one embedded command.

13. The apparatus of claim 10, wherein the proxy compares a domain name associated with an embedded command of the at least one embedded command within inbound network traffic with a domain name associated with the embedded command of the at least one embedded command within outbound network traffic.

14. A non-transitory computer readable medium comprising software that, when executed by a processor, causes the processor to perform a method comprising:
processing network traffic associated with a browser using a client network proxy coupled to a client device to identify at least one command parameter that forms at least one embedded command within at least one Uniform Resource Locator, wherein the at least one embedded command defines an operation requiring one or more local computer system resources of the client device that the browser does not have a sufficient access level to utilize;
communicating the at least one command parameter for execution by the client network proxy using the one or more local computer system resources of the client device where the client network proxy has a sufficient access level to access the one or more local computer system resources of the client device; and
authenticating the at least one embedded command by comparing a unique identifier associated with an embedded command of the at least one embedded command within inbound network traffic with a unique identifier associated with an embedded command of the at least one embedded command within outbound network traffic.

15. The non-transitory computer readable medium of claim 14, wherein processing the network traffic further comprising:
   processing outbound network traffic to identify the at least one command embedded in the at least one Uniform Resource Locator; and
   parsing the at least one Uniform Resource Locator to extract the at least one command parameter.

16. The non-transitory computer readable medium of claim 15, wherein communicating the at least one command parameter further comprises redirecting the at least one command parameter to an application for executing the at least one command parameter.

17. The non-transitory computer readable medium of claim 14, wherein processing the network traffic further comprising:
   processing inbound network traffic to identify the at least one command embedded in the at least one Uniform Resource Locator; and
   parsing the at least one Uniform Resource Locator to extract at least one unique identifier and at least one domain name.

* * * * *